United States Patent [19]
Krolick et al.

[11] Patent Number: 4,708,592
[45] Date of Patent: Nov. 24, 1987

[54] HELICOIDAL STRUCTURES, USEFUL AS WIND TURBINES

[75] Inventors: Robert S. Krolick, San Rafael; James S. Storey, South San Francisco; Robin E. LeFever, Oakland, all of Calif.

[73] Assignee: Wind Production Company, Millbrae, Calif.

[21] Appl. No.: 922,777

[22] Filed: Oct. 28, 1986

Related U.S. Application Data

[63] Continuation of Ser. No. 723,196, Apr. 15, 1985, abandoned.

[51] Int. Cl.$^4$ .............................................. B64H 1/22
[52] U.S. Cl. .......................... 416/176 A; 416/196 A; 290/55; 40/440
[58] Field of Search ............... 416/176 A, 176 R, 177, 416/196 A; 415/71, 72, 75; D15/1; 290/55, 44; 40/27, 430, 602, 212, 213, 214, 215, 216, 217, 440, 473, 493

[56] References Cited

U.S. PATENT DOCUMENTS

| | | | |
|---|---|---|---|
| 85,508 | 1/1869 | Beach | 416/176 |
| 464,607 | 12/1891 | Brown | 416/176 |
| 625,614 | 5/1899 | Thompson | 416/196 A |
| 893,052 | 7/1908 | Carlson | 416/176 |
| 969,522 | 9/1910 | Carlson | 416/176 |
| 996,309 | 6/1911 | Carlson | 416/176 |
| 1,001,291 | 8/1911 | McKenzie | 416/196 A |
| 1,064,695 | 6/1913 | De Koning | 416/176 |
| 1,089,239 | 3/1914 | Mason | 416/196 A |
| 1,504,259 | 8/1924 | Miller | 416/176 |
| 1,767,995 | 6/1930 | McChesney | 416/177 |
| 1,794,828 | 3/1931 | Bleriot | 40/215 |
| 1,821,021 | 9/1931 | Moise | 40/440 |
| 2,688,820 | 9/1954 | Shemet | 40/440 |
| 3,941,504 | 3/1976 | Snarbach | 416/176 |
| 3,964,189 | 6/1976 | Belokin, Jr. | 40/430 |
| 4,084,102 | 4/1978 | Fry et al. | 290/55 |
| 4,086,026 | 4/1978 | Tamanini | 416/176 |
| 4,087,990 | 5/1978 | Gillette | 416/176 A |
| 4,218,175 | 8/1980 | Carpenter | 416/176 |
| 4,293,274 | 10/1981 | Gilman | 416/176 |
| 4,357,130 | 11/1982 | Forrest | 416/196 A |
| 4,412,417 | 11/1983 | Dementhon | 416/176 A |

FOREIGN PATENT DOCUMENTS

| | | | |
|---|---|---|---|
| 30716 | 11/1922 | Denmark | 416/171 |
| 522526 | 8/1921 | France | 40/215 |

OTHER PUBLICATIONS

"Leonardo" magazine, V17, #2, pp. 104–107, 1984: Ruled Surfaces: . . . , by MacDonnell.

*Primary Examiner*—Robert E. Garrett
*Assistant Examiner*—John T. Kwon
*Attorney, Agent, or Firm*—David Pressman

[57] ABSTRACT

A collapsible structure comprising a non-rigid helicoidal sheet braced by light-weight members according to one of several methods. The structure is used in the construction of a wind turbine, wherein a flexible fabric sheet (21) is reinforced by wires (42) sewn into its edges, and may be further reinforced by ribs or battens (30) sewn crosswise into the sheet. One end of the turbine is cnnected via a swivel (24) to a fixed mast (22) while the other end is conneced to the shaft (26) of an alternator. The electrical output of the alternator is connected through a rectifier/regulator (34) to a storage battery (38), thereby providing constant DC power. An alternative method of bracing employs ribs (30) along with counterhelical cables (64).

20 Claims, 14 Drawing Figures

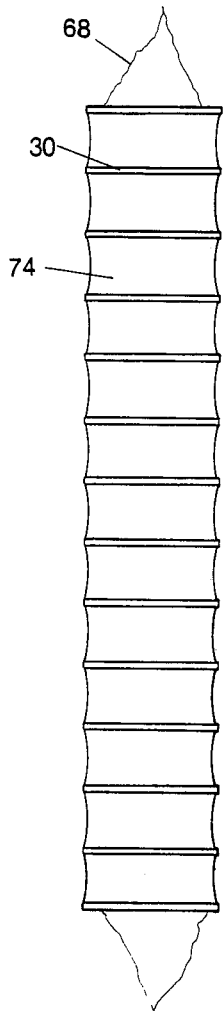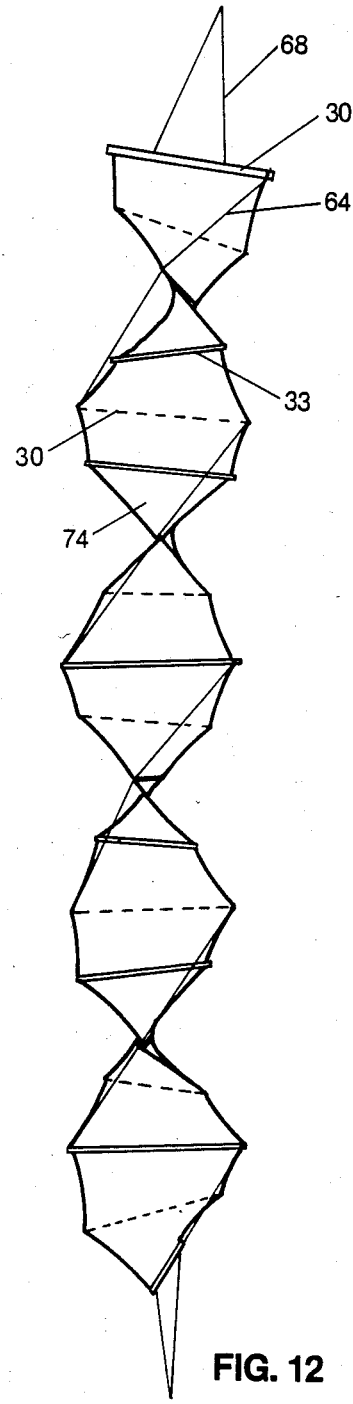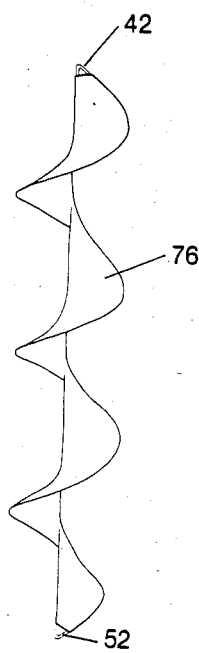
FIG. 13
FIG. 12
FIG. 14

HELICOIDAL STRUCTURES, USEFUL AS WIND TURBINES

This application is a continuation of U.S. Ser. No. 723,196, filed Apr. 15, 1985 has now been abandoned.

BACKGROUND

1. Field of Invention

This invention relates to the field of basic structural designs, especially to helicoidal structures useful for wind turbines and other purposes.

BACKGROUND

2. Description of Prior Art

Windmills have been used for centuries to pump water and grind grain, and recently to generate electric power. They have evolved from the classical fan-blade type through the many-bladed variety still seen on farms to the large airfoil propeller and vertical axis hoop turbines capable of generating over a megawatt each. However, these designs all suffer for several shortcomings which either prevent their use in many applications, or render it uneconomical.

The basic problem in extracting power from wind is its low density of power per unit volume handled. The maximum amount of power that may be extracted is proportional to the circular cross-sectional area through which the blades rotate, multiplied by the square of the wind velocity. In other words, the power available is the total kinetic energy of the air moving through the turbine's cross-section per unit of time. However, an actual turbine will only extract a fraction of this power, this fraction being defined as the turbine's efficiency.

Since physical contact between the air and the turbine blades is necessary to transfer the power, the blades must either have an aggregate area equal to a large fraction of their circular cross section, or they must rotate so rapidly that they are able to interact with most of the air flowing therethrough. The many-bladed farm windmill uses the first of these strategies and the thin airfoil propeller type uses the second.

The large-fractional-area or first of the foregoing types has been built with large and therefore expensive turbine blades. Inevitably, such blades are heavy and require large and costly shafts, bearings, and supporting structures. A heavy turbine of this sort must always be kept precisely balanced to avoid destructive vibration.

The small-fractional-area (thin propeller) design (second of the foregoing types) must rotate at such a high speed that it requires very expensive bearings, speed reduction gearing, and lubrication systems; furthermore it suffers from rapid wear and therefore frequent need for maintenance and repair. This type of turbine also has a very low efficiency at low wind velocities and will not even begin to rotate below a substantial wind velocity threshold.

Furthermore, because turbines mounted close to the earth pose a danger to humans and other animals and are not placed in optimum wind conditions, both types of turbines must be mounted high above the ground. This requires that the electric generator be mounted at the top of a tower, thereby making turbine and generator maintenance very difficult and increasing the required tower strength and cost. The alternative of feeding the power down a long rotating shaft has obvious problems of weight, vibration, and lubrication as well as maintenance at multiple bearing locations along the shaft.

Clearly, both the large and small fractional-area designs known heretofore have disadvantages which render them uneconomical and which have thereby limited their use either to regions of high and constant wind velocity or to localities so inaccessible that fuel or electric lines cannot be connected.

Finally, conventional wind turbines, even if mounted high above the ground, also pose a severe or fatal injury hazard to people and animals that may wander near them unless the lowest reach of the blades is kept far enough above the ground by additional tower height, and even then a hazard still exists if the turbine or parts of it break off and fall. This tends to make them unsuitable for small-scale use, for example by the owner of a private home or boat.

OBJECTS AND ADVANTAGES

Accordingly, several objects and advantages of the invention are to provide a wind turbine which is efficient, safe, easy to maintain, and above all inexpensive to build. Another object is to provide a wind turbine which is collapsible. A further object is to provide a new helicoidal structure. Further objects and advantages will become apparent from a consideration of the ensuing description and accompanying drawings.

Definitions of Terms

A helicoid is a three dimensional surface formed by means of two straight line segments. Imagine, e.g., a fixed axis line AB and another line CD (not shown). CD extends out from AB at a right angle. End C of line CD travels along line AB at a uniform rate from point A to point B. While so moving, CD also rotates around AB at a uniform rate. Thus end D of CD traces the same shape as the outer edge of a machine screw thread.

Under these circumstances, the surface traced by line CD is known as a single helicoid. A turbine in the shape of a single helicoid is illustrated in FIG. 14. It is similar to a spiral vehicle ramp in a multi-story parking garage.

More precisely, this curve is a single right helicoid because generating line CD, and therefore the resulting surface, lies at a right angle to the axis. Hereafter, this right angle will be assumed, although other angles may be used to generate turbine shapes if desired.

Now, assume that line CD is extended through the axis AB until it is of equal length on both sides of the axis and it is again moved along the line or axis while being rotated. Under these circumstances, both point C and point D will trace a helix. The surface traced by line CD will be a double helicoid. A turbine in the shape of a double helicoid is illustrated in FIG. 2.

Hereafter, unless otherwise qualified, the term "helicoid" will denote a double rather than a single helicoid; furthermore, it will refer to a closed helicoid, one having a single sailcloth as shown in FIG. 2, rather than an open helicoid, as depicted in FIG. 9. I.e., a closed helicoid has no central longitudinal gap in its surface. This is usually the preferable configuration for power generation.

Varieties of Non-Rigid Helicoidal Turbines

The present invention offers many possible variations in the design of wind turbines including:
A. The surface may be a double or a single helicoid.
B. Additionally it may be a closed or an open helicoid.

C. Bracing may be by means of edge-wires and ribs, edge-wires alone, or counter-helical cables.
D. The sail (working surface) may be made by joining curved panels of non-elastic fabric or it may be made from a continuous straight strip of elastic fabric.

The design of a particular turbine will involve selecting one option from each of these four sets, according to factors inherent in the application.

DRAWING FIGURES

On the first of the six sheets of drawings:

On the second sheet of drawings:

FIG. 3 illustrates an edge-wired helicoidal sail collapsed for storage or transport.

FIG. 4 is a side view of a warning buoy powered by a horizontal edge-wired turbine.

FIG. 5 shows a buoy utilizing a vertically positioned turbine.

On the third sheet of drawings:

FIG. 6 shows a warning tripod powered by an edge-wired turbine.

On the fourth sheet of drawings:

FIG. 7 is a plan view of a set of non-elastic fabric pieces which will comprise a turbine sail when sewn together.

FIG. 8 is a perspective view of the cloth sail made by joining the pieces shown in FIG. 7, with the edge wires partially inserted.

On the fifth sheet of drawings:

FIG. 9 is an overhead view of a counter-helically braced, open, double helicoid connected between the top of a pylon and a generator on the ground.

FIG. 10 illustrates the sail of FIG. 9 untwisted and laid flat.

Figure 10:
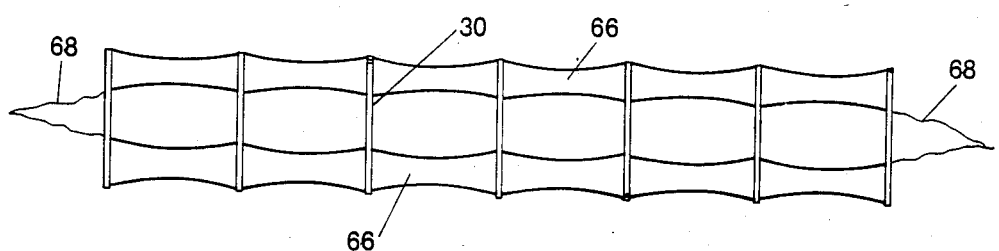
Figure 11:
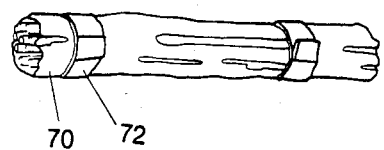

FIG. 11 illustrates the sail of FIG. 10 rolled up in a cover for storage.

On the sixth sheet of drawings:

FIG. 12 shows a counter-helically braced closed helicoidal turbine.

FIG. 13 illustrates the sail of FIG. 12 untwisted and laid flat.

FIG. 14 illustrates a single helicoid edge-wired turbine.

DRAWING REFERENCE NUMERALS 20 edgewired helicoidal turbine comprising sail plus bracing
21 non-elastic fabric sail
22 mast
23 shaft
24 swivel
26 alternator shaft
28 alternator
30 rib
32 electrical cable
34 rectifier/regulator
36 electrical cable
38 storage battery
40 electrical cable
42 edge wire
44 strobe lamp
46 frame
48 buoy
50 tripod
52 bracket
54 safety cable
56 optional spike
58 fabric panel
60 hem parallel to axis
61 hem perpendicular to axis
62 tower
63 counter-helically-braced open helicoidal turbine
64 counterhelical cable
66 elastic fabric strip
68 cable
70 cover
72 strap
74 elastic fabric sail
76 non-elastic fabric sail

DETAILED DESCRIPTION

Figure 1:
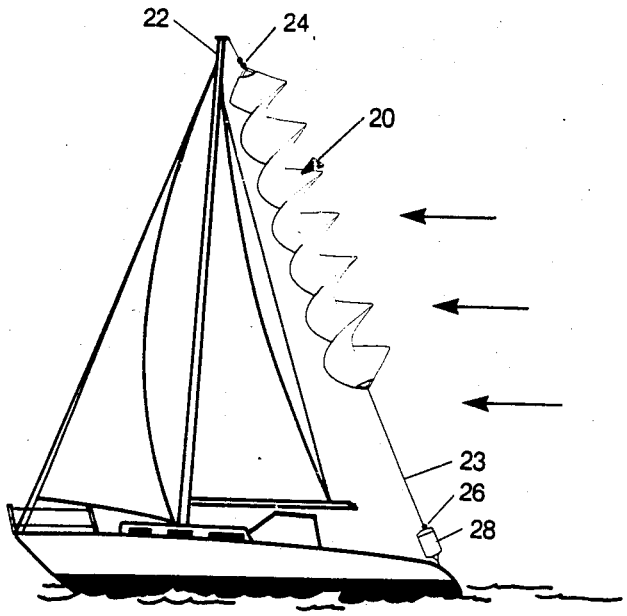
FIG. 1 is a side view of an edge-wired wind turbine according to the invention, installed on a sailboat.
Figure 2:
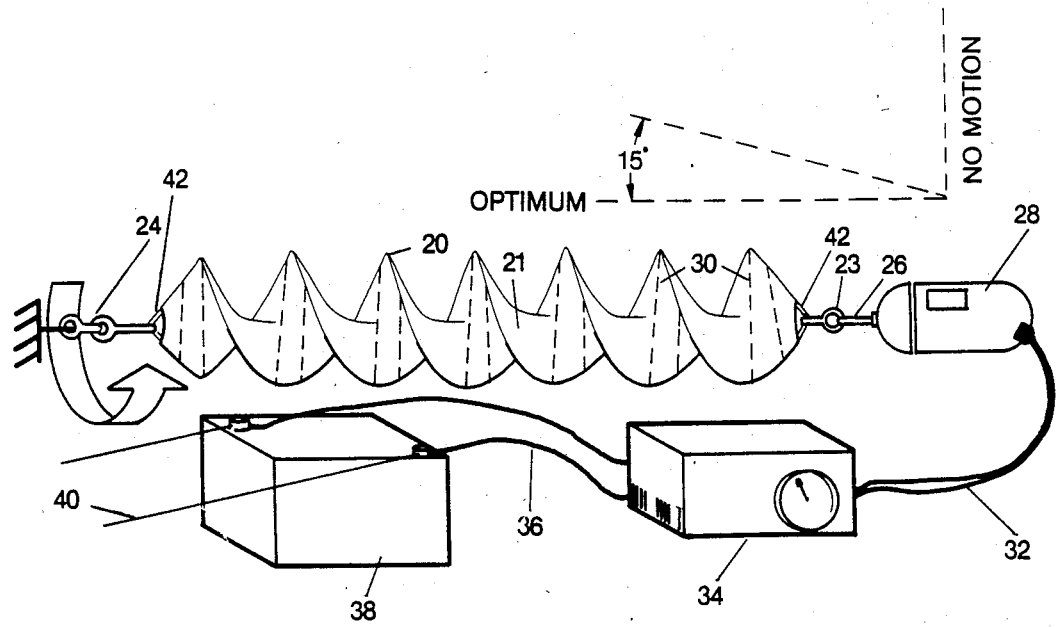
FIG. 2 is an enlarged view of a small electric power generating system according to the invention, such as that of FIG. 1.

Non-Rigid Helicoidal Wind Turbine—FIGS. 1 and 2

As shown in the side view of FIG. 1, a wind turbine manufactured according to one embodiment of the invention may be easily and conveniently mounted on a sailboat. Power is thereby provided for the operation of the radio, lights, etc., which would otherwise require repetitive battery replacement or separate, awkward recharging in a small engineless craft of this sort.

A turbine 20 is suspended at its upper end from a mast 22 by means of a swivel 24 which permits free rotation of the upper end of the turbine. In spite of the fact that the mast is a pre-existing structure which in no way was designed to support a wind turbine along with the normal sails, it may nevertheless be safely employed for this additional purpose by virtue of the extremely low weight of the turbine.

The lower end of turbine 20 is connected via a lightweight shaft or taut cable 23 to a shaft 26 of an alternator (i.e., an AC generator) 28, which is fixed to the deck of the boat. In this application, the low rotational speed and consequent lack of hazard to personnel are clearly indispensable.

FIG. 2 provides a more detailed view of this small electrical generating system. Turbine 20 comprises a fabric portion—hereafter called a sail—21 which is braced into a helicoidal configuration by means of two edge wires 42. Sail 21 is further stiffened by means of a succession of rigid ribs or battens 30 which are sewn into the sail at approximately 90-degree intervals around the helicoid. At one end, the edge wires are fastened to shaft 23 to which the rotational power of the turbine is transmitted. Shaft 23 in turn rotates shaft 26 of alternator 28, causing it to produce electrical power.

Note that the direction and strength of the rotation of the turbine depends upon the wind direction. If the wind blows in the direction shown in FIG. 1, which is the usual case if the boat is sailing, then the turbine will rotate counter-clockwise as seen from the alternator. If the wind blows in the opposite direction, from bow to stern, the turbine will rotate clockwise as seen from the alternator. If the wind blows precisely from port or starboard, i.e., perpendicular to the turbine's axis, then no motion will result.

More generally, for a given wind velocity, the power generated by a helicoidal turbine of the invention is found to be approximately proportional to the cosine of the angle between the turbine axis and the wind direction. Thus, the power output will be nearly maximal when the wind direction is within 15 degrees of the axis, and will fall to approximately 70% of the maximum at 45 degrees, as indicated in FIG. 2.

At wind direction angles within the optimal range, rotation is created by two distinctly different effects. One side of the helicoid operates as a drag surface with low efficiency but high area, acting as a simple impediment to wind flow. The other side operates as a lift surface with high efficiency and low area. The resulting forces act in the same direction to produce usable rotary power.

Alternator 28 generates alternating current regardless of the direction in which its shaft is turned. Its output is conveyed via a cable 32 to a rectifier/regulator 34 which converts it to direct current and then transmits the correct amount of current through a cable 36 to a storage battery 38, i.e., the amount of current which will keep the battery full charged but not overcharged. Regardless of the direction in which the alternator turns, the DC output of rectifier/regulator 34 will have the same polarity. As in almost all wind-electric power systems, a storage battery is required to provide constant availability of power to the load in spite of the intermittent presence of the wind.

In one embodiment of the invention, a turbine as shown in FIG. 2 was made 3 m long, 76 cm in diameter, with a helical pitch of about 30 cm. The material of the sail was nylon sailboat material and the edge wire was #10 drawn steel wire. The battens were made of hardwood dowels, 8 mm in diameter. The alternator was a 12-volt device. The rectifier/regulator and battery were from a conventional 12-volt system. The system was operated in prevaling Westerly winds at a height of about 3 meters in Daly City, Calif., about 1 mile from the Pacific Ocean. It was found to generate an average power during daytime of 15 to 18 watts under windspeeds of about 36 kph. It operated reliably, efficiently, and safely at an average speed of about 100 rpm. Indeed when accidentally contacted by humans during operation, no injury resulted due to its low rotational speed and lack of any blades.

Figure 3:
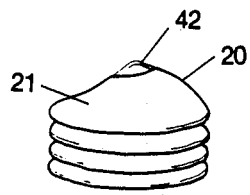

Collapsibility of Edge—Wired Turbine—FIG. 3

As illustrated in FIG. 3, the edge-wired helicoidal turbine of FIGS. 1 and 2 may be easily collapsed into a volume much smaller than its working volume by simply detaching it from its supports, suspending it vertically by one end, and then lowering it to the ground. when an alternative method of bracing is used, i.e., counter helical cables, as illustrated in FIGS. 9 to 13, the same method of collapsing for storage can be employed. Given that many applications for the use of wind power are found in locations to which transportation is difficult, the ability to ship the turbine(s) in a small volume is extremely advantageous.

Figure 4:
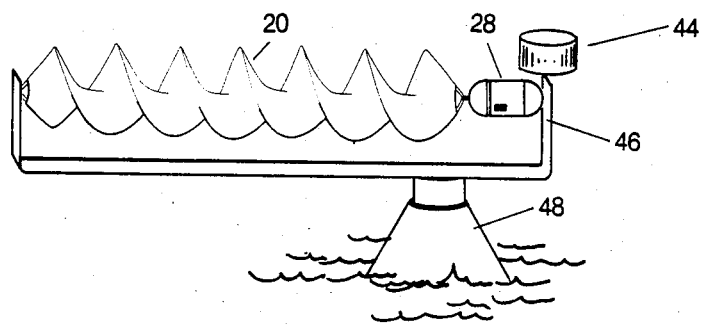
Figure 5:
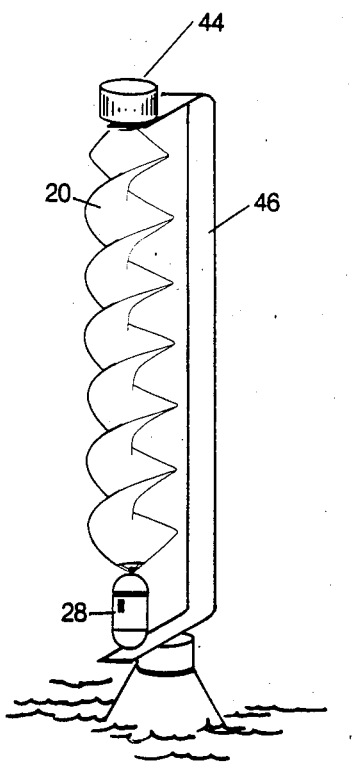

Wind-Powered Buoys—FIGS. 4 and 5

Warning and navigational buoys may be efficiently provided with electrical power by means of a non-rigid helicoidal wind turbine in the manner shown in FIG. 4. Horizontal turbine 20 is supported at each end by a frame 46 which is mounted asymmetrically upon a buoy 48. This arrangement permits the wind, by pushing on the end of the turbine farthest from the center of the buoy, to rotate the buoy and turbine so that the turbine axis is approximately parallel to the direction of the wind, thereby maximizing the generated power.

A generator 28, and a rectifier, regulator, and storage battery (not shown) within the body of the buoy combine to produce constantly available power, as previously described for FIG. 2. The generated power may be employed to operate a strobe lamp 44, or other device such as a radio, radar, or sonar beacon or transponder, or a foghorn.

FIG. 5 illustrates an alternate embodiment in which turbine 20 is mounted vertically. With this arrangement, the force of the wind pushing against the turbine causes it and the buoy to tilt, thus causing the angle between the turbine axis and the wind direction to deviate from 90 degrees, which in turn allows the wind to rotate the turbine.

Figure 6:
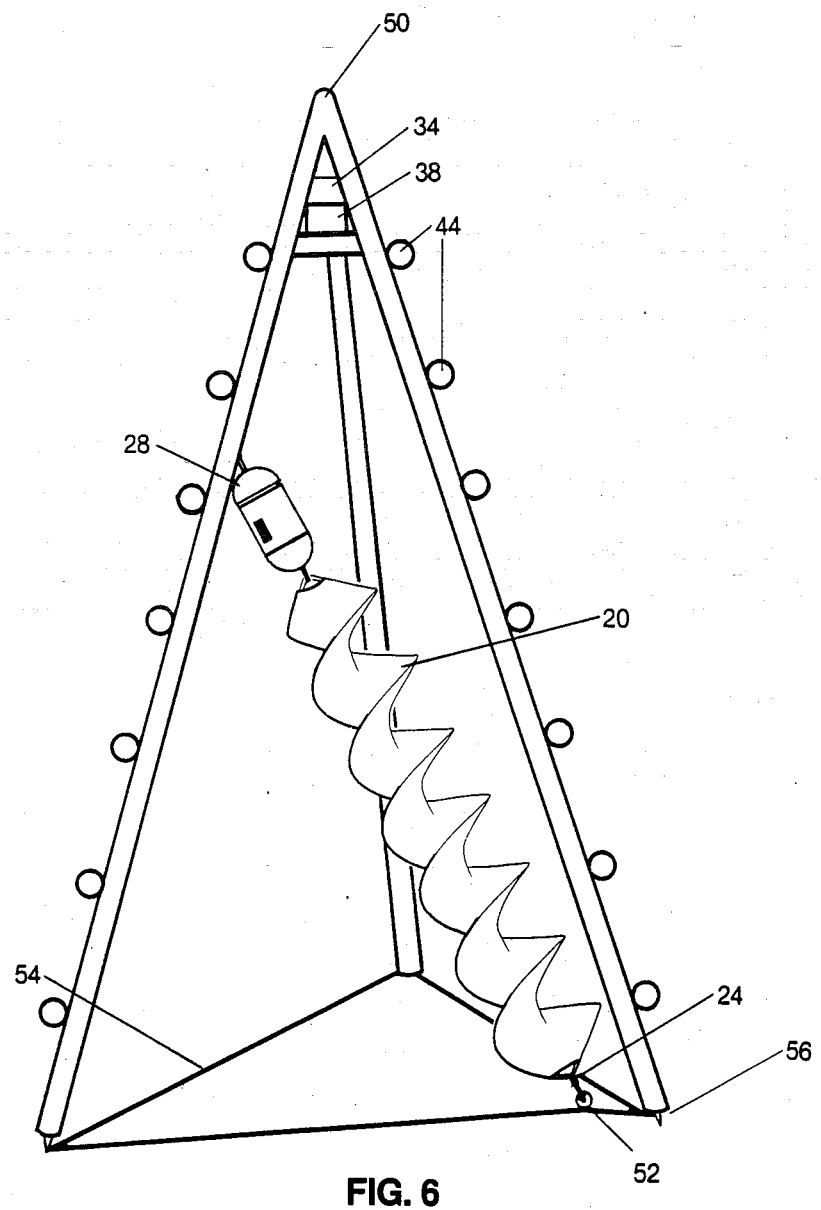

Wind-Powered Warning Tripod—FIG. 6

The strobe-light warning tripod shown in FIG. 6 may be employed to call attention to highway detours, road repair work parties, etc. The basic structure comprises a tripod 50 supplied with safety cables or chains 54 and optional ground-gripping spikes 56. Power for the strobe lamps 44 is provided by a wind turbine 20. The bottom end of the turbine is mounted via a swivel 24 to a bracket 52 which is fixed to one leg of the tripod. The upper end of the turbine is connected to the shaft of an alternator 28 which is mounted on the tripod near the top. a rectifier/regulator 34 and storage battery 38 function as in FIG. 2. An additional controller and strobe circuit is built into rectifier/regulator 34 which flashes the lamps 44 at regular intervals. If desired, this circuit may use a photoelectric cell to turn off the flashing during daylight hours.

Figure 7:
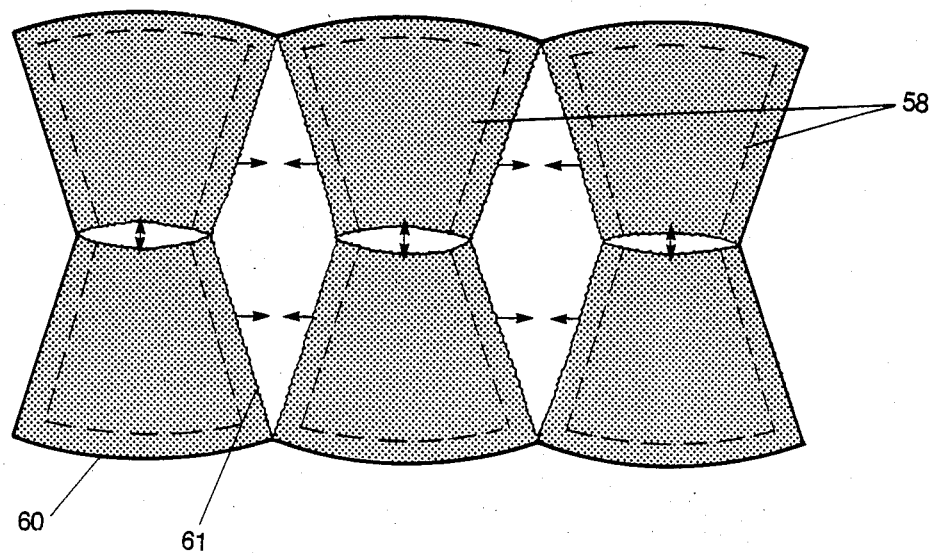
Figure 8:
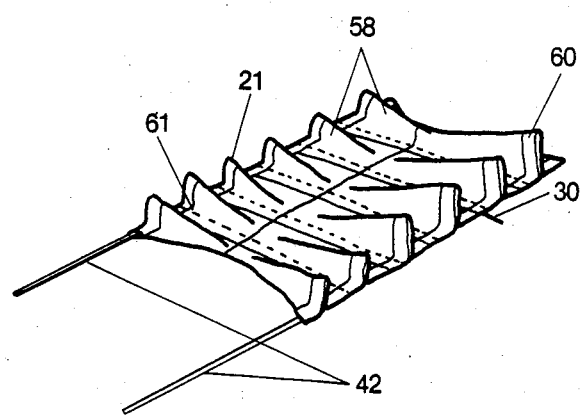

Assembly of Edge-Wired Helicoidal Turbine—FIGS. 7 and 8

A fabric strip (sail) 21 which is to be formed into a helicoidal surface must have a greater length along the edges than at the center. This may be seen from the fact that to traverse a helicoid from end to end, one may travel a relatively short distance along the axis or a much greater distance along the helical periphery. Accordingly, the fabric strip must be shaped as depicted in FIG. 8.

The construction of sail 21 is accomplished by joining together a number of fabric panels 58, each having an arcuate trapezoidal shape. The panels are laid out as illustrated in FIG. 7 and joined together (preferably by sewing, but other methods, such as adhesive may be used) along adjacent edges as shown by the arrows. Either before or after joining, the outer edges of the panels are folded inward a short distance and sewn to create the hems 60 on each side, parallel to the axis.

After the fabric said has been created in this manner, edge wires 42 are inserted into hems 60 and pushed through for the entire length of the sail. When this is done, the sail automatically warps into the desired helicoidal shape due to the inherent curl of the wire (which is normally wound on a spool for shipping). As shown, when edge wires 42 are in the sail, they will assume a helical shape; the helix will be an expanded helix when the sail is stretched into its helicoidal shape (FIG. 1), and it will be a compressed or compact helix when the sail is collapsed (FIG. 3). The length of the wires is chosen to exceed that of the sail by a small amount and the two protruding excess lengths of wire at each end are joined together. The loops 42 thereby created are employed subsequently as the attachment points by which the turbine is mounted and its power output is transmitted.

If desired, the turbine may be given additional structural stability by the incorporation of a set of rigid ribs 30 into the fabric sail, crosswise to the axis, as illustrated in FIG. 8. In order to accomplish this, crosswise hems 61 are sewn into panels 58 before the panels are joined together (see FIG. 7). The ribs, whose length is made equal to the width of the sail, are inserted into the crosswise hems and fastened in place by appropriate permanent or removable means.

Figure 9:
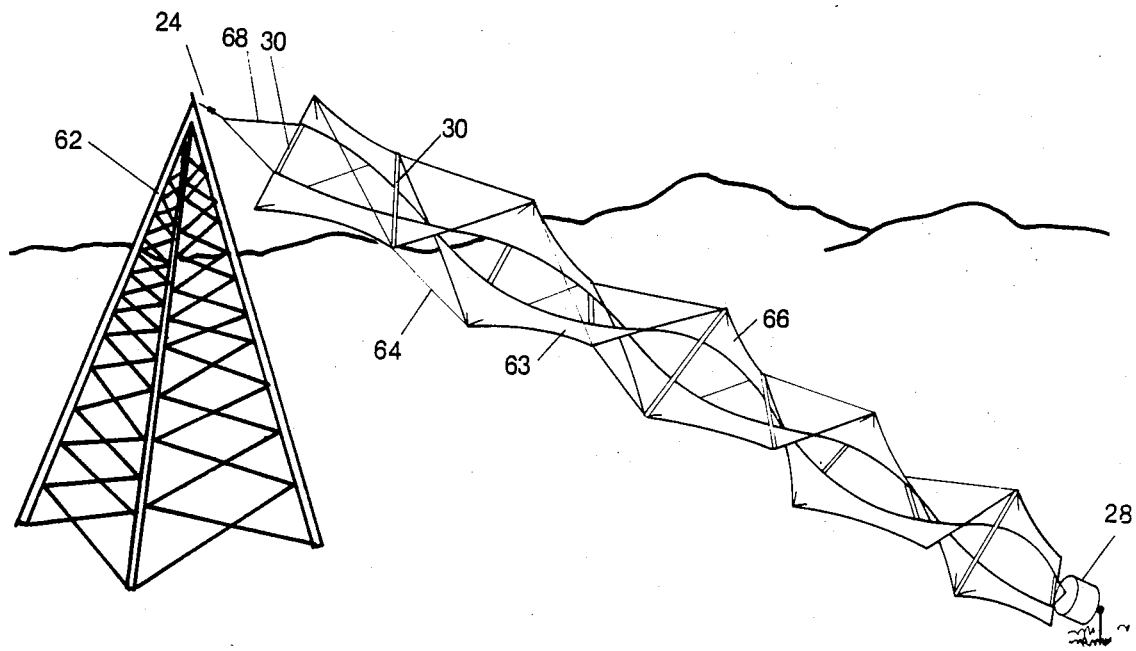

Counter-Helically Braced Open Helicoidal Turbine—FIGS. 9, 10 and 11

These figures illustrate another embodiment of the invention which incorporates the counter-helical method for bracing the non-rigid helicoidal turbine. This embodiment also employs elastic fabric and an open helicoidal surface.

The fabrication of the turbine is shown in FIG. 10. Two elastic fabric strips 66 are connected by crosswise rigid ribs 30. Cables 68 are connected to the end ribs and serve as attachment and power transmittal points.

In use (FIG. 9), the ribbed sail is twisted into the desired helicoidal shape and braced by means of two cables 64 which are wound helically around the turbine axis but in a direction counter to that of the sail. The cables are connected as shown in an alternating manner to the ends of the ribs. The combination of forces of sail and cable tension plus rib compression combine to maintain the sail surface in the proper shape.

The elasticity of the fabric in this embodiment serves the same purpose as the extra amount of fabric incorporated into the edges of the non-elastic sail shown in FIG. 8, i.e., it supplies the necessarily greater length along the edge of the helicoid relative to that along the axis.

The resulting turbine is deployed between a tower or pylon 62, to which it is attached by means of a swivel 24, and the shaft of the ground-mounted generator 28, which is turned by the turbine to produce electric power. To prevent access by people and animals, generator 28 may be mounted above the ground on an adjacent pylon (not shown). Many pylons with their wind-turbine generators as shown in FIG. 9 may be mounted in a windy area to provide a "wind farm".

For convenient storage and shipping, a turbine of this type may be removed from its supports and rolled up as depicted in FIG. 11, surrounded by a cover 70 and secured by straps 72.

In this embodiment, the size of the turbine may be quite large, e.g., 20 m or more long. Power of several hundred watts or more may be generated. The sail material may be nylon as before and the battens may be wood or plastic.

Counter-Helically Braced Closed Turbine—FIGS. 12 and 13

The turbine illustrated in FIGS. 12 and 13 is designed identically to that of FIGS. 9 and 10 save that the elastic fabric sail 74 comprises a single strip, thereby producing a closed helicoidal surface.

Single Helicoidal Turbine—FIG. 14

The final figure shows a turbine identical to that of FIG. 2, save that its fabric sail 76 comprises only one-half of sail 21 of FIG. 2. In other words, sail 76 may be constructed as shown in FIG. 7 if the upper panels 58 are used and the lower panels are omitted. One edge wire is inserted in the remaining peripheral hem as before, while the other is inserted into an additional hem sewn along the axis. While this embodiment is not as efficient as the double helicoid versions, it is simpler, lighter, and more economical.

Additional Turbine Applications

Turbines constructed according to the invention will also find use for the generation of useful power from the movement of fluids other than air, more particularly from flowing water, such as oceanic tides and currents. Helicoidal turbines may also be used in decorative applications, for example in advertising displays and toys, and in conjunction with kites, either incorporated into the tail of the kite or spliced into the tether line. These turbines may also be used to move a fluid as a result of rotational power being applied to the turbine. This process may be employed either for the purpose of moving the fluid or in order to move the turbine and the objects attached to it, i.e. as an airplane or ship propulsion mechanism.

Non-Turbine Applications

As previously noted, the essence of the invention lies in the new structural principles advanced herein. The various braced helicoidal structures described above may be applied in a variety of other applications unrelated to turbine design. These may include the construction of storage, support, dwelling, display, transport and other facilities.

Note that one main aspect of the invention is a structure comprising a flexible helicoidal sheet braced by light-weight members. Note that this structure permits the inexpensive construction of wind turbines, yet with the ability to produce useful power in applications unsuited to previous rigid wind turbines. While the structural principles comprising the fundamental designs of the invention have been described from the standpoint of wind turbine construction, it should be understood that structures built according to these principles will find application in a multitude of other areas, as indicated.

Also note that the invention uses a high fractional-area design in which the large blades are replaced by a helicoid made of a very light and low cost material.

Further note that the design has good efficiency even at low wind velocities and does not require reduction gearing because it rotates at low speed, with correspondingly high torque. Thus almost all of the bearings, gears, shafts, etc., in previous designs are eliminated, and the remainder need only function at low rotational speeds. The generator is easy to maintain because it is situated at ground level. These factors, plus the low cost of the turbine and its supports, result in a very great cost reduction compared to conventional designs.

Because the overall shape of the turbine is cylindrical rather than disklike, a large wind intrcepting area has been created—this because it utilizes a long axis and a modest radius. When this small radius is multiplied by the low rotational rate, a very low circumferential velocity results, which in turn presents very little hazard to anyone who might come into contact with the turbine.

The turbine may be collapsed into a volume which is very small compared to its working volume. Installation then consists simply of unfolding it and attaching it to the supports at each end.

The turbine is lightweight, non-hazardous, useful at low wind speeds, stable in gusty wind, collapsible, easy to transport and install, and inexpensive in both construction and maintenance. Furthermore, structures built according to the physical principles described above may be used in many other applications.

A wide variety of materials and components may be used in the fabrication of such turbines and other structures, in that the fabric panels and sheets, wires, cables and ribs described above may be replaced by any other means capable of performing the same or similar functions. The construction of the basic helicoidal surface may be accomplished by other methods than those described above, and a variety of means and combinations of means may be employed for the purpose of bracing the surface into the helicoidal shape. In addition, the helicoidal shape may be modified in a variety of ways, not limited to, e.g., tapering from one end to the other, usage of a non-circular cross-section or a variable spacing from turn to turn, or the employment of openings or attachments at various locations along the shape.

In general, while the above description contains many specificities, these should not be construed as limitations upon the scope of the invention, but as exemplifications of preferred embodiments thereof. Many other embodiments are feasible within its scope. Accordingly the full scope of the invention should be determined by the appended claims and their legal equivalents, and not be the examples given.

I claim:

1. A wind-responsive structure, comprising, in combination:
   an elongated sheet of flexible material which is substantially impervious to the wind and which has oppositely-disposed ends,
   bracing means attached to and extending throughout the length of said sheet, said bracing means being disposed on said sheet to permit said sheet to be collapsed into a folded compact condition and to position said sheet into a helical configuration upon the application of a pulling force to said oppositely disposed ends of said sheet, said bracing means comprising at least one elongated member, and
   attachment means at said oppositely-disposed ends of said sheet for attaching said sheet to respective associated supporting structures.

2. The structure of claim 1 wherein said elongated member has a helical shape and is attached along an edge of said sheet.

3. The structure of claim 1 wherein said bracing means comprises a plurality of crosswise stiffeners aligned substantially transverse to said long dimension of said sheet and attached at a plurality of points thereto and at least one tension bearing member attached to a plurality of points along said sheet.

4. The structure of claim 1 wherein said sheet of flexible material comprises a substantially flat rectangle when in an unstressed state, said bracing means comprising a plurality of cross braces attached at right angles to said sheet at spaced points therealong, and wherein said attachment means comprises a plurality of cables attached to the ends of said sheet.

5. The structure of claim 4, further including a plurality of guy cables attached to the ends of said cross braces and arranged to hold said braces at angles to each other.

6. The structure of claim 5 wherein said sheet comprises two elongated strips of material with a space therebetween.

7. The structure of claim 1 wherein said bracing means further includes a plurality of crosswise stiffeners aligned substantially transverse to said long dimension of said sheet and attached to said sheet at a plurality of points therealong.

8. The structure of claim 1 wherein said attachment means includes means for permitting rotation of said turbine.

9. The structure of claim 8, further including an electric generator and wherein said attachment means comprises means to cause said generator to rotate in response to rotation of said turbine.

10. The structure of claim 9, further including an electrical rectifier and a storage battery connected to receive power from said generator.

11. The invention of claim 10, further including a bouy which includes a lamp connected to said storage battery, said turbine being mounted on said bouy.

12. The invention of claim 10, further including a warning light supporting structure which includes a lamp connected to said storage battery, said turbine being mounted on said warning light supporting structure.

13. The invention of claim 10, further including a tower, said turbine being attached between said tower and a point other than said tower which is lower than said turbine's point of attachment to said tower so that said turbine will intercept earthly wind.

14. The structure of claim 1 wherein said helicoid is a double helicoid.

15. The structure of claim 1 wherein said helicoid is a single helicoid.

16. The structure of claim 1 wherein said sheet comprises a plurality of flat, generally trapezoidal sections attached together at the edges thereof and wherein said bracing means comprises a pair of stiffening wires inserted into hems at opposite edges of said sheet.

17. A structure which rotates in response to the flow of a fluid against said structure, comprising, in combination:
    an elongated sheet of flexible material which is substantially impervious to said fluid and which has oppositely-disposed ends,
    reinforcing means attached to said sheet and causing said sheet to assume a helicoidal shape when said oppositely-disposed ends of said sheet are pulled away from each other in opposite directions, and permitting said sheet to collapse into a folded, compact, non-helical condition in absence of any pulling force at said opposite ends, said reinforcing means comprising at least one elongated member, and
    means for attaching said opposite ends of said sheet to a pair of respective fixed points external to said sheet.

18. The structure of claim 17, further including a plurality of perpendicular reinforcing members oriented substantially perpendicularly to the direction of elongation of said sheet and attached at a plurality of points thereto.

19. The structure of claim 17 wherein said reinforcing means comprises at least one wire attached to an edge of said sheet.

20. A structure which rotates in response to the flow of a fluid against said structure, comprising, in combination:
    a substantially helicoidal member, said substantially helicoidal member being formed of an elongated sheet of material and a plurality of reinforcing members attached to said sheet, said sheet being impervious to said fluid and freely flexible, warpable, foldable, and incapable of assuming any fixed shape on its own, said plurality of reinforcing members being oriented along lines extending generally perpendicular to the direction of elongation of said sheet, said reinforcing members being attached to said sheet at a plurality of locations therealong, at least one flexible interconnecting member connected between separate turns of said substantially helicoidal member so as to assist in the maintenance of the shape of said helicoidal member, said reinforcing members being free of attachment to any rigid supports so that they can move together in absence of any tension applied to opposite ends of said helicoidal member, such that said helicoidal member can be easily collapsed to a compact, folded, non-helicoidal shape in absence of tension at said opposite ends thereof.

* * * * *